Oct. 16, 1962                    A. BLOCK                    3,058,269
                            SURFACE FINISHING DRUM
Filed Jan. 26, 1960                                    4 Sheets-Sheet 1
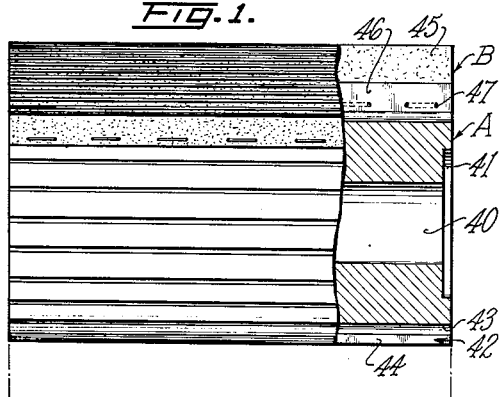
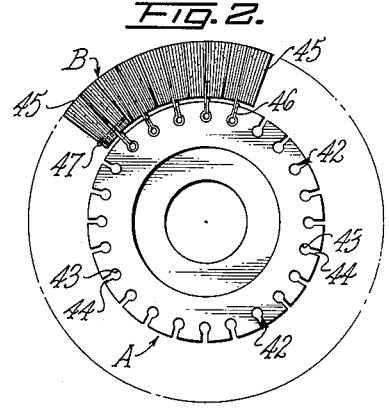
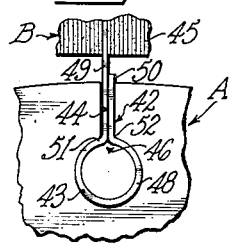
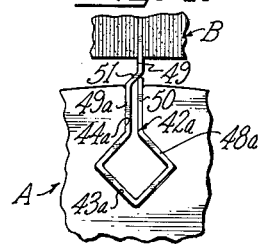
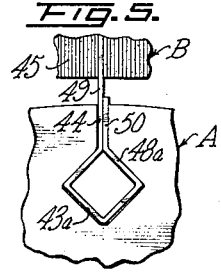
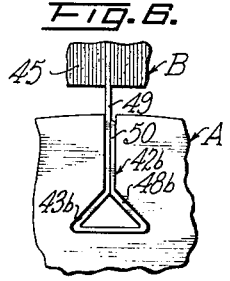
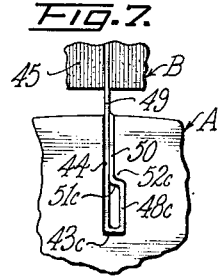
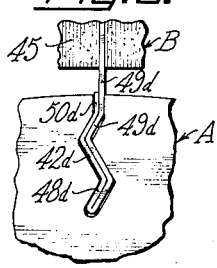
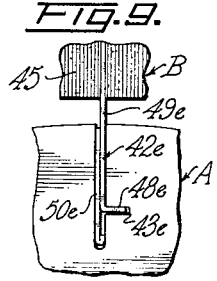
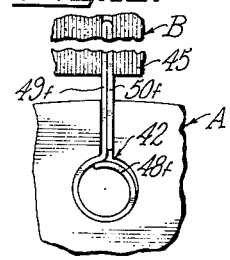
INVENTOR.
ALECK BLOCK
BY
Lynn H. Latta
ATTORNEY Oct. 16, 1962 A. BLOCK 3,058,269
SURFACE FINISHING DRUM
Filed Jan. 26, 1960 4 Sheets-Sheet 2
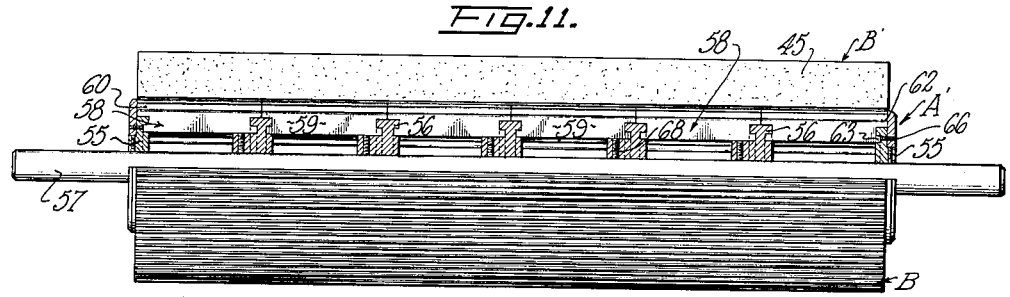
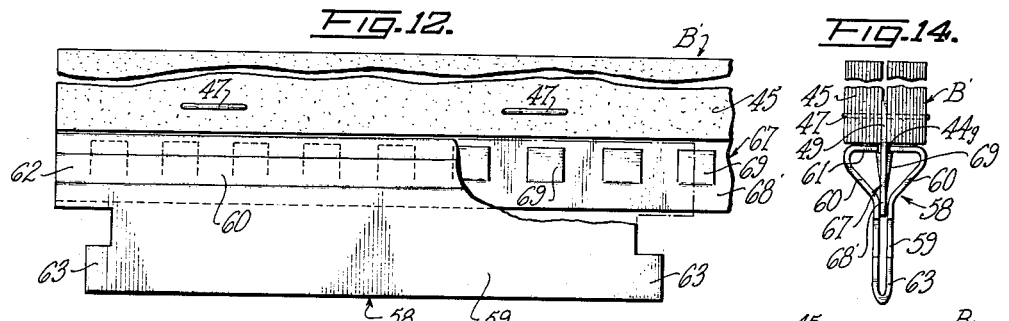
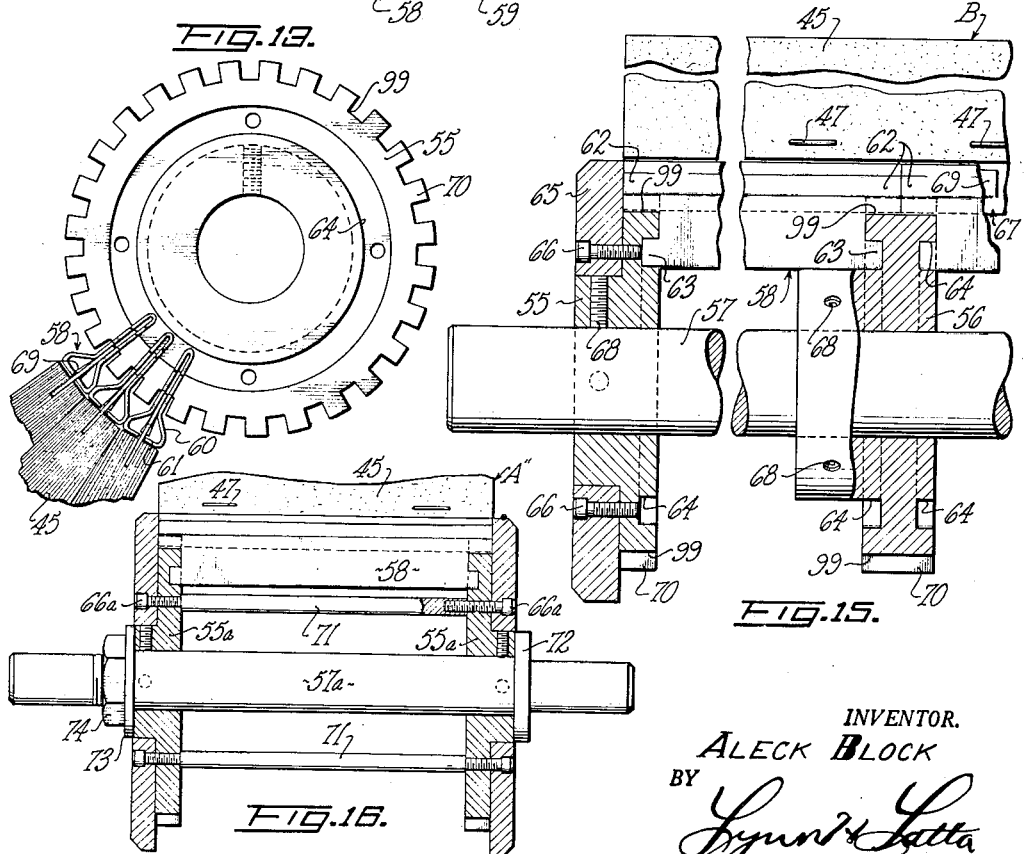
INVENTOR.
ALECK BLOCK
BY
ATTORNEY

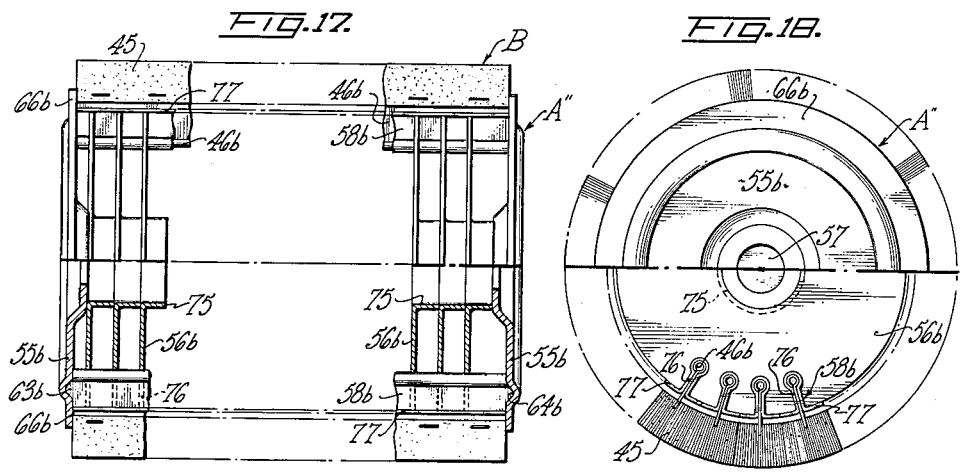
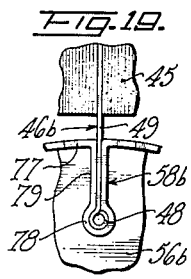 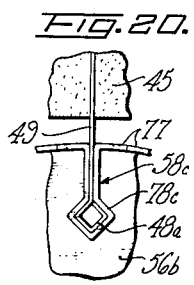 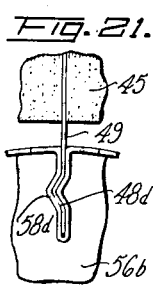 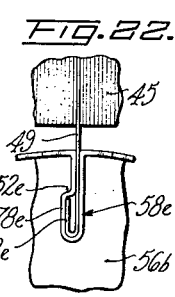
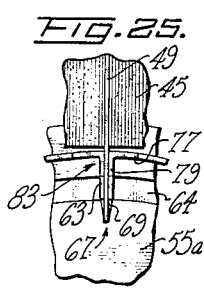 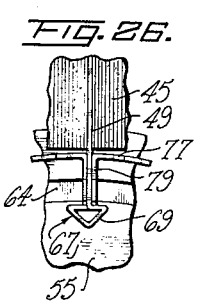 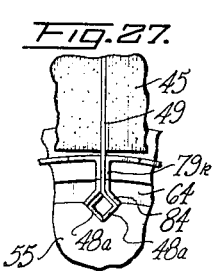 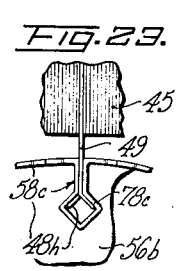
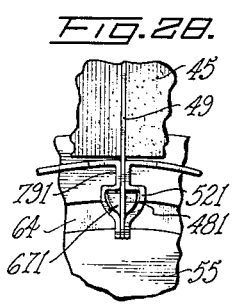 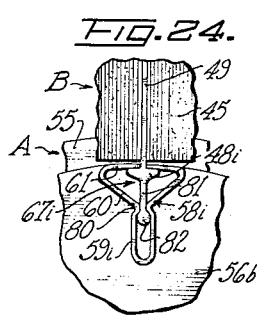

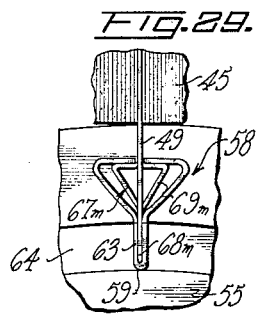
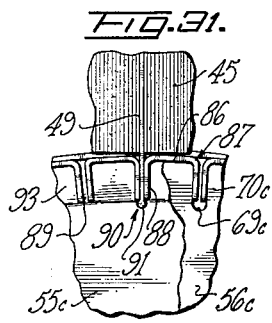
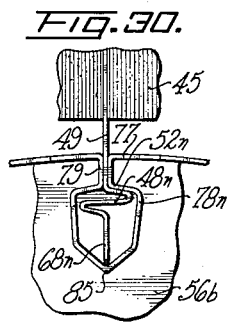
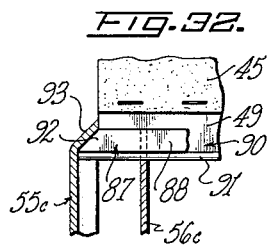
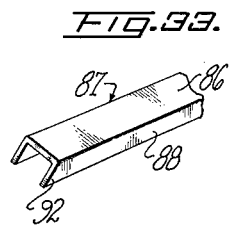
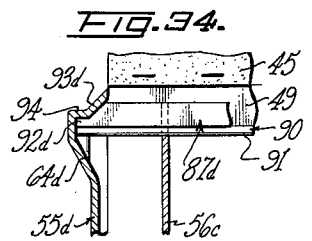
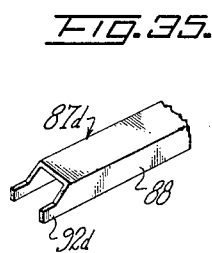
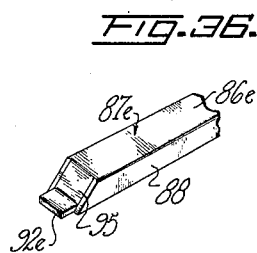
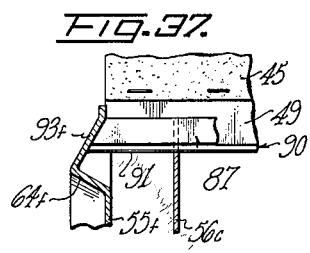
INVENTOR
ALECK BLOCK United States Patent Office 3,058,269
Patented Oct. 16, 1962

3,058,269
SURFACE FINISHING DRUM
Aleck Block, Los Angeles, Calif., assignor to Merit Products, Inc., Los Angeles, Calif., a corporation of California
Filed Jan. 26, 1960, Ser. No. 4,786
4 Claims. (Cl. 51—193.5)

This application is in part a continuation of my pending application S.N. 691,076 filed October 17, 1957, for Sectional Abrasive Drum, now abandoned.

This invention relates to rotary abrasive surface finishing devices of the type employing circumferentially arranged abrasive leaves in an elongated cylindrical drum-like array, wherein a plurality of circumferentially juxtaposed abrasive segments are detachably anchored to a cylindrical hub, for removal and replacement by fresh abrasive units when worn beyond useful condition. Abrasive drums and wheels of this general type are disclosed in the prior patents of R. W. Bernstein and myself, Number 2,821,819 issued February 4, 1958; and No. 2,842,980, issued July 22, 1958. The general object of the present invention is to provide an improved abrasive drum assembly of this general type.

The invention deals with the problem of secure anchorage of the replaceable abrasive segments in a manner to resist the effect of centrifugal force acting upon the segments during rotation of the drum, and has as a major object to provide such a drum embodying anchoring means adapted to secure the abrasive segments uniformly throughout the axial extent of the drum, in positions accurately fixed radially so that the tips of the segments may collectively define an accurately cylindrical abrading surface concentric with the axis of rotation of the drum.

A further object is to provide such a drum including abrasive segments provided with anchoring means of maximum simplicity and inexpensive and lightweight construction combined with dependable sturdiness for maintaining the above mentioned accuracy of anchorage of the segments in the drum hub.

Other objects and advantages will become apparent in the ensuing specifications and appended drawing in which:

FIG. 1 is a side elevational view of an abrasive drum embodying the preferred form of the invention, with a major portion of the abrasive segments removed and their position at one side of the drum indicated in phantom with broken lines, and with an end portion of the drum broken away and shown in section;

FIG. 2 is an end view of the drum showing a small portion of the segments in full lines and with the remainder indicated in phantom;

FIG. 3 is a fragmentary enlarged end view of a small segment of the drum illustrating the preferred form of the segment anchor;

FIG. 4 is a fragmentary enlarged end view showing a modified anchor;

FIG. 5 is a fragmentary end view showing another modified anchor;

FIG. 6 is a fragmentary end view showing yet another modified anchor;

FIG. 7 is a fragmentary end view showing another modified anchor;

FIG. 8 is a fragmentary end view showing another modified anchor;

FIG. 9 is a fragmentary end view showing another modified anchor;

FIG. 10 is a fragmentary end view showing another modified anchor;

FIG. 11 is a side elevational view, partially in axial section of an abrasive drum embodying a modified form of the invention;

FIG. 12 is a fragmentary axial sectional view of the same, on a larger scale;

FIG. 13 is an end view of the drum of FIG. 11, with a majority of the abrasive segments omitted;

FIG. 14 is a fragmentary end view detail of one of the abrasive segments and its anchor;

FIG. 15 is a fragmentary side view of one of the abrasive units of FIG. 11 and its anchor;

FIG. 16 is an axial sectional view of an abrasive wheel embodying a modified form of the drum of FIG. 11;

FIG. 17 is a fragmentary sectional view of an abrasive drum embodying another modified form of the invention;

FIG. 18 is an end view of the abrasive drum of FIG. 17, partially in section;

FIG. 19 is a fragmentary detail sectional view of one of the segments of FIG. 18 and its anchor;

FIG. 20 is a fragmentary detail view of a modified form of the anchor of FIG. 19;

FIG. 21 is a fragmentary detail view of another modified form of the anchor of FIG. 19;

FIG. 22 is a fragmentary detail view of another modified form of the anchor of FIG. 19;

FIG. 23 is a fragmentary detail view of another modified form of the anchor of FIG. 19;

FIG. 24 is a fragmentary detail view of another modified form of the anchor of FIG. 19;

FIG. 25 is a fragmentary detail view of another modified form of the anchor of FIG. 19;

FIG. 26 is a fragmentary detail view of another modified form of the anchor of FIG. 19;

FIG. 27 is a fragmentary detail view of another modified form of the anchor of FIG. 19;

FIG. 28 is a fragmentary detail view of another modified form of the anchor of FIG. 19;

FIG. 29 is a fragmentary detail view of another modified form of the anchor of FIG. 19;

FIG. 30 is a fragmentary detail view of another modified form of the anchor of FIG. 19;

FIG. 31 is a fragmentary sectional view of an abrasive drum embodying another modified form of the invention;

FIG. 32 is a fragmentary side elevational view, partially in section, of the abrasive drum of FIG. 31;

FIG. 33 is a perspective view of one of the retainer beams of FIG. 32;

FIG. 34 is a fragmentary detail side view of a modified form of the same;

FIG. 35 is a perspective view of the retainer beam of FIG. 34;

FIG. 36 is a perspective view of another modified retainer beam; and

FIG. 37 is a fragmentary axial sectional view of another modification of the abrasive drum of FIG. 32.

*The Preferred Form of the Invention (FIGS. 1–3)*

Referring now to the drawings in detail, I have shown in FIGS. 1, 2 and 3 thereof a preferred form of the invention, embodying in general a hub A having a bore 40 adapted to receive a mounting shaft or arbor and a shallow flat circular annular recess 41 at each end thereof, for receiving a mounting flange or washer on the mounting shaft or arbor. The assembly of hub, shaft and washer can be secured by a nut threaded on one end of the shaft, all in accordance with conventional construction which, being no part of the present invention, is not illustrated. The hub A is particularly characterized by being molded or cast from a synthetic resin plastic material of relatively hard, rigid character, although metal can be employed if desired.

In the periphery of hub A are a series of anchor sockets 42 of key-hole slot form (FIG. 2) extending the full length of hub A parallel to its rotational axis, and each having a cylindrical inward socket chamber 43 (FIG. 3) and a relatively narrow flat mouth slot 44 extending radially from the socket 43 to the periphery of the hub.

Attached to the periphery of hub A are a series of abrasive segments B. Each of the abrasive segments B includes a pack of abrasive leaves 45 of flexible sheet material coated with abrasive grains (or a pack of leaves alternately of abrasive coated sheet material and uncoated spacer sheets); and an anchor indicated generally at 46, to which the leaves 45 are securely anchored by suitable securing means such as rivets or staples 47 (FIG. 2).

Each of the anchors 46 includes a cylindrical head 48 fitted within the respective cylindrical socket 43; a flat web 49 extending radially from the head 48 and overlapping the base portions of leaves 45; and a flat tab 50 likewise projecting radially from head 48 and in contact with web 49 (or substantially in contact therewith); the web 49 and tab 50 are substantially filling the mouth 44 but with slight clearance such that the anchor 46 can be freely slid longitudinally into and out of the key-hole socket 42 for removing and replacing worn segments. A very slight opening bias may be provided in the anchor 46 (preferably of resilient spring sheet metal—it can be of spring sheet metal) so as to yieldingly maintain snugness of fit of the web 49 and tab 50 in the socket mouth 44, and to avoid vibration of the anchors in the sockets. In the operative positions of the segments, the shoulders 51 of heads 48, defined at the junctions with web 49 and tab 50, will bear solidly against the corresponding shoulders of hub A where the mouth 44 communicates with bore 43.

For accuracy, the key-hole sockets 42 are machine finished, as by broaching, and because of thickness limitations of the broach, the spacing between the walls of mouth 44 is a minimum dimension. The doubling of the sheet metal of anchor 46 where the web 49 and tab 40 come together, provides for snugly filling the mouth 44.

Between the outer end of tab 50 and the abrasive leaves 45, the anchor 46 extend single thickness in the web 49, and this single thickness is preferably interposed between respective sections of a split group of the leaves 45 (although it is possible to have all of the leaves 45 secured to one side of the web 49). In either event, the minimum thickness of the web portion 49 which extends into the array of abrasive leaves, minimizes the separation of the leaves at that point, as well as providing a somewhat flexible bridging connection between the anchor 46 and the block of abrasive leaves 45, whereby the successive abrasive segments may adjust themselves to positions of equalized compression around the circumference of the abrasive drum. The butt portions of the abrasive segments B are so proportioned with relation to the circumferential spacing between the key-hole sockets 42 as to make firm abutting contact with one another in the assembly of abrasive segments in the drum. The base portions of the abrasive leaves 45 are placed under compression in the butt portions of the segments by the setting up of rivets or staples 47, thus rigidifying the butt portions and reinforcing them so that when abutting one another in the drum assembly they will be braced to a maximum extent against circumferential deflection under the drag developed in operation against the work.

Modified Anchors—FIGS. 4–10

FIG. 4 illustrates a modified form of the anchor wherein the head 48a is of square tubular form, wherein the key-hole socket 42a embodies a socket chamber 43a of square prismatic form, wherein the web 49 is joined by an offset 51 to a web portion 49a which is spaced substantially from the tab 50, the outer end of the latter being braced against the shoulder 51 to develop firm engagement between the tab 50 and web portion 49a against the wall of socket mouth 44a, which can be somewhat wider than the mouth 44.

FIG. 5 illustrates modification similar to that of FIG. 4, including square tubular head 48a but with tab 50 snugly bearing against web 49 and the two snugly engaged in socket mouth 44.

FIG. 6 illustrates how the head 48b may be of triangular tubular form instead of the cylindrical and square tube form described above, the socket chamber 43b of anchor socket 42b being correspondingly triangular.

FIG. 7 illustrates how the anchor head 48c may be of flat rectangular tube form, elongated radially, with the anchor socket chamber 43c being of correspondingly rectangular section, the enlargement of anchor and anchor socket being confined to one side of each and with an anchoring shoulder 51c on one side of the anchor bearing against a retainer should 52c in the hub A.

FIG. 8 illustrates how the head 48d of the anchor can be formed by folding back the tab portion 50d of the anchor strip against the web portion 49d thereof, and by deforming the folded part of the anchor to a Z-section which is received in a correspondingly Z-shaped anchor socket 42d in the hub A.

FIG. 9 illustrates how the retainer head of the anchor may be formed by flatly folding tub 50e against web 49e and by striking laterally from the folded material a finger 48e which is engaged in a lateral, circumferentially extending portion 43e of the anchor socket 42e.

FIG. 10 illustrates how the double thickness of the radial part of the anchor can be provided for by doubling back upon itself that portion of the anchor strip which projects between the abrasive leaves 45, the head 48f being a tubular roll on the inner end of the web 49f, and the tab 50f extending the full radial extent of web 49f. The anchor socket 42 is the same as in FIG. 3.

Modified Form of Abrasive Drum—FIGS. 11–15

FIG. 11 discloses a modified hub structure A' (shown fragmentarily in detail in FIG. 15) wherein end headers 55 and intermediate headers 56 are mounted upon a drive shaft 57 and support a series of anchor socket units 58 each of which is in the form of an elongated channel of T-section including a folded stem section 59, a pair of outwardly diverging arms 60 and circumferentially inwardly projecting flanges 61 integral with the ends of arms 60. Flanges 61 are spaced apart to define a mouth slot 44g which is aligned with the space between stem portions 59. At each end of each of the anchor sockets 58 is an axially projecting anchor tang 63 which is received in an annular face groove 64 in a respective end header 55 or intermediate header 56 as the case may be. Tangs 63 are located at the radially inward extremities of stem portions 59. The radially outward arm and finger portions 60, 61, of each socket unit have end-projecting portions 62 overlying the peripheries of the respective headers 55, 56, and in end-abutting engagement over the peripheries of intermediate headers 56. At the outward ends of the drums, the projecting end portions 62 are engaged by respective retainer rings 65, detachably secured to end headers 55 by cap screws 66, thus retaining the socket 58 (and the segment anchors 67 (FIG. 14) of abrasive segments B'). End headers 55 are suitably secured to shaft 57, as by means of set screws 68, to maintain all of the parts in assembly.

FIGS. 12 and 14 disclose a modification wherein anchor 67 comprises simply a flat sheet of metal or equivalent sheet material, providing a web 68 the inner margin of which is snugly received within the folded stem portion 59 of socket 58, and having a series of longitudinally spaced tangs 69 struck laterally in two alternately opposite sides thereof, with the outer ends of tangs 69 projecting for engagement against the inner sides of retainer fingers 61 of socket 58. The outward portions of webs 68 are projected into the respective groups of abrasive sheet 45 which are tightly clamped thereto under compression by the rivets or staples 47 (FIG. 14). The butt portions of abrasive sheets 45 may be spaced just slightly outwardly from the outward ends of retainer tangs 69 so as to bear against the outward faces of fingers 61 to additionally brace the segments when anchored in the sockets 58.

The headers 55 and 56 are provided with circumferentially spaced peripheral notches 99 receiving the projecting end portion 62 of sockets 58 and accurately positioning the sockets in correct circumferential spacing with relation to one another. The notches 99 are defined between peripheral jaws 70 which terminate approximately where the arms 60 of sockets 58 diverge from stem portions 63.

FIG. 29 discloses a modification which is the same as that of FIG. 14 with the exception that the tangs 69m are formed by striking laterally from the web 49 of the anchor 67m, and inward stem portions 68m of the anchor 67m is bottomed in the stem portion 59 of socket 58.

FIG. 16 illustrates how the general structure of FIGS. 11-15 can be embodied in an abrasive wheel of relatively short axial extent, with only the end headers 55a supporting a single circumferential array of sockets 58, with the abrasive segments A″ being correspondingly short, and with the assembly being tied together by tied rods 71 extending between and attached by cap screws 66a to the respective headers 55a. The shaft 57a is correspondingly shorter. A flange 72 and washer 73, secured by a nut 74, may be utilized for additionally securing the parts in assembly.

*Further Modified Forms—FIGS. 17-28*

FIG. 17 illustrates a modification of the drums of FIGS. 11-16 wherein stamped sheet metal end headers 55b and stamped sheet metal intermediate headers 56b are assembled on an arbor or shaft 57, and with axial spacing between the headers provided by integral hub sleeves 75 on the spacers 56b. Stamped sheet metal socket units 58b, of key-hole slotted channel construction, are anchored in key-hole notches 76 in the respective spacers 56b. The socket units 58b, like socket units 58, are of elongated channel form, and each has at its respective ends, anchor projections 63b which are receivable in respective annular grooves 64b formed in the end headers 55b. Each of the socket units 58b includes circumferentially spreading wings 77 seated against the peripheral edges of spacer discs 56b, with the wings of adjacent socket units in edge-abutting engagement so as to collectively define a closed cylindrical peripheral wall for the hub A″. The abrasive segments B may be substantially the same as in FIGS. 1-3, their anchors 46 being the same except for omitting the tab 50. They are received in the respective socket units 58b and insertable and removable by axially sliding movement. The end headers 55b have peripheral flanges 66b for retaining the segments B against axially shifting movements.

FIG. 19 illustrates the anchor 46b, which may comprise simply a web 49 and a cylindrical rolled head 48 on its inner end, received in the socket portion 78 of socket unit 58b, flat cheek portions 79 of socket unit 58b being parallel and slightly spaced to snugly receive the web 49.

FIG. 20 shows a modification of the anchor assembly of FIG. 19, wherein the socket element 78c is of square tube form instead of cylindrical and wherein the anchor head 48a is correspondingly of square tube form.

FIG. 30 shows a construction similar to that of FIG. 20, but with the cross sectional configuration of socket 78n being of spade form, and the anchor head 48n being of Z-form as shown and having an inwardly projecting stem 68n seated in the bottom of the trough portion 85 at the inward extremity of socket 78n, and with the outward bend of head 48n engaged against a shoulder 52n of the socket 78n. The head 48n may be resilient and arranged to yieldingly maintain snug engagement of the stem 68n in trough 85 and head 48n against shoulder 52n.

FIG. 21 illustrates a modification generally similar to FIG. 6, but with a V-head 48d of single thickness, the socket unit 58d being of corresponding configuration.

FIG. 22 illustrates a modification similar to FIG. 7, but with the anchor head 48e in the form of an open channel and the tab 50 eliminated. The socket unit 78e is of corresponding configuration.

FIG. 23 discloses a modification of FIG. 20 arrangement, wherein the head 48h of the socket unit is formed as a series of tongues separated from one another by slits in a marginal portion of web 49 and bent laterally, alternately in opposite directions in Y-branching arrangement, the two rows of tongues being engageable within the square tubular socket 78c of the socket units 58c. The ends of tongues 48h are engaged in the lateral corners of sockets 78c to support the web 49 against radially inward shifting.

FIG. 24 shows a socket unit 58i similar to the socket unit 58 of FIG. 14 except that the stem section 59i is somewhat wider, and is joined to arms 60 by opposed shoulders 80 defining a restricted throat through which a stem portion 81 of the anchor 67i extends, a head 48i joining stem 81 to web 49 and being engaged against the inner faces of retainer fingers 61, and a second head 82 being formed on the inner end of stem 81 and engaged against shoulder 80. The abrasive segments in this case are supported against inward shifting by seat of the butt ends of abrasive sheets 45 against the periphery of the hub A.

*Modified Forms—FIGS. 25-28*

FIG. 25 discloses a further modification of the abrasive drum wherein retainer socket assembly 83, with open inner ends, are defined by a pair of opposed angle bars each having a peripheral flange 77 and radially inwardly extending cheeks 79. The cheeks 79 are circumferentially spaced to define radial retainer slots, and their ends have projecting tangs 63 for anchoring the ends of the angle bars in annular grooves 64 in headers 55a of a hub arrangement such as is shown in 15 (or 16). Anchor 67, the same as in FIG. 14, may have its tangs 69 engaged against the inner margins of checks 79 to secure the abrasive segments against radially outward shifting under centrifugal force, and the butt ends of abrasive sheets 45 may be seated against the periphery of the hub, defined by flanges 77, for supporting the segments against inward shifting.

FIG. 26 shows a modified construction, the same as that of FIG. 25 with the exception that the head 69 of anchor 67j is of dart form as shown.

FIG. 27 shows a further modification wherein the construction is the same as in FIG. 25 with the exception that the inner extremities of cheeks 79k are flared at 84 to provide a seat of dihedral channel form against which a square tubular anchor head 48a may be seated.

FIG. 28 illustrates another modification, the same as in FIG. 25 with the exception that the socket cheeks 97l are formed with laterally channelled portions 52l cooperatively defining a shouldered socket receiving an anchor head 48l. In the modifications shown in FIGS. 24 and 28 the respective anchor 67i and 67l may be formed as extruded sections to provide thereon the solid head members 48i, 82 and 48l.

*Modified Forms—FIGS. 31-37*

FIG. 31 discloses a further modification of the abrasive drum wherein the periphery of the drum is defined by the webs 86 of a series of channel bars 87 each of which has cheeks 88 extending radially inwardly, with the cheeks of adjacent bars 87 circumferentially spaced to define retainer slots 89 in which the anchors 90 are snugly received. As shown, the anchor 90 may be in the simple form of a plane flat web 49 with an integral bead 91 extending along its inner margin to adapt to engage the inner edges of cheeks 89 to anchor the respective segments against outward shifting while inward shifting is prevented by seating of the butt ends of the sheets 45 against the peripheral webs 86.

Cheeks 88 have, at their inner ends, projecting tangs 92 of beveled form, adapted to extend beneath a conical retainer flange 93 on the rim of a header 55c, for supporting the retainer bar against outward shifting under centrifugal force, intermediate headers 56c (FIG. 32) with teeth 70c at its periphery, engaged within the respective channel bars 87, and with intervening notches 69c receiving the heads 91, being utilized as spacers and for supporting the bars 87 against inward shifting. FIG. 33 shows one of the retainer bars 87 in perspective.

FIG. 34 discloses a modification of the arrangement of FIGS. 31–33, wherein the end tangs 92d of retainer bars 87d are engaged beneath cylindrical shoulders 94 formed in the retainer flanges 93d, which in this case may be integral parts of annular anchor channels 64d of end headers 55d. A perspective view of the modified retainer beam 87d is shown in FIG. 35.

FIG. 36 shows a modified form of the anchor bar of FIG. 35, wherein projecting tang 92e is formed as the bent end of a tab 95 constituting an integral extension of web 86e of the anchor bar 87e.

FIG. 37 shows a further modification of the arrangement of FIG. 32, wherein retainer flange 93f constitutes one side of an annular retainer channel 64f of annular section at the periphery of end spacer 55f, the anchor bars 87 being the same as in FIG. 33.

I claim:

1. In a rotary abrasive surface finishing drum, in combination: a hub structure embodying a plurality of circumferentially spaced peripheral anchor sockets extending parallel to the axis of rotation of the drum, each of said sockets including a radially extending restricted mouth and an inner socket chamber having a circumferentially extending retainer shoulder; and a plurality of abrasive segments each including a pack of abrasive leaves and an anchor strip having a web to which inward end portions of said leaves are secured to provide respective solid butt sections from which the leaves project in outwardly fanned array, with the tip portions thereof relatively loose and flexible, each of said anchor strips further including, in the inward portion thereof, an anchor head providing a circumferentially extending anchor part engaged against said retainer shoulder to lock the anchor strip in the respective socket, with the respective web extending through and embraced between the walls of the respective socket mouth, whereby the respective abrasive segments are supported on said hub with their tips collectively defining a cylindrical abrading periphery on said drum; said hub comprising a shaft and a plurality of headers of circular disc form mounted concentrically on said shaft in axially spaced relation and having axially opposed retainer recesses; and said anchor sockets comprising socket units of formed sheet material each including a circumferentially broadened socket portion defining said socket chamber and having circumferentially inwardly projecting opposed parts defining said mouth, said socket units each having, at respective ends thereof, axially projecting parts engaged in respective recesses and anchoring said socket units to said headers in circumferentially spaced positions bridging axially between said headers.

2. In a rotary abrasive surface finishing drum, in combination: a hub structure embodying a plurality of circumferentially spaced peripheral anchor sockets extending parallel to the axis of rotation of the drum, each of said sockets including a radially extending restricted mouth and an inner socket chamber having a circumferentially extending retainer shoulder; and a plurality of abrasive segments each including a pack of abrasive leaves and an anchor strip having a web to which inward end portions of said leaves are secured to provide respective solid butt sections from which the leaves project in outwardly fanned array, with the tip portions thereof relatively loose and flexible, each of said anchor strips further including, in the inward portion thereof, an anchor head providing a circumferentially extending anchor part engaged against said retainer shoulder to lock the anchor strip in the respective socket, with the respective web extending through and embraced between the walls of the respective socket mouth, whereby the respective abrasive segments are supported on said hub with their tips collectively defining a cylindrical abrading periphery on said drum; said hub comprising a shaft and a plurality of headers of circular disc form mounted concentrically on said shaft in axially spaced relation and having axially opposed retainer recesses; and said anchor sockets comprising socket units of formed sheet material of channel form, each including a narrow inward channel part and an outward, circumferentially broadened socket portion defining said socket chamber and having circumferentially inwardly projecting opposed parts defining said mouth and said retainer shoulder, said socket units each having, at respective ends thereof, axially projecting parts engaged in respective recesses and anchoring said socket units to said headers in circumferentially spaced positions bridging axially between said headers; said anchor strips each including an inward stem embraced in said inward channel part, and having its said anchor head integrally formed between said stem and said web.

3. In a rotary abrasive surface finishing drum, in combination: a hub structure embodying a plurality of circumferentially spaced peripheral anchor sockets extending parallel to the axis of rotation of the drum, each of said sockets including a radially extending restricted mouth and an inner socket chamber having a circumferentially extending retainer shoulder; and a plurality of abrasive segments each including a pack of abrasive leaves and an anchor strip having a web to which inward end portions of said leaves are secured to provide respective solid butt sections from which the leaves project in outwardly fanned array, with the tip portions thereof relatively loose and flexible, each of said anchor strips further including, in the inward portion thereof, an anchor head providing a circumferentially extending anchor part engaged against said retainer shoulder to lock the anchor strip in the respective socket, with the respective web extending through and embraced between the walls of the respective socket mouth, whereby the respective abrasive segments are supported on said hub with their tips collectively defining a cylindrical abrading periphery on said drum; said hub comprising a shaft and a plurality of headers of circular disc form mounted concentrically on said shaft in axially spaced relation and having axially opposed retainer recesses; and said anchor sockets comprising socket units of formed sheet material each including a circumferentially broadened socket portion defining said socket chamber, said socket units each having, at respective ends thereof, axially projecting parts engaged in respective recesses and anchoring said socket units to said headers in circumferentially spaced positions bridging axially between said headers; each of said socket units being of channel section disposed generally radially with a pair of cheeks spaced circumferentially to define the socket mouth and terminating in circumferentially spreading wing portions collectively defining the periphery of the drum, each socket unit further including an inward channel portion joining said cheeks and providing said inward socket chamber.

4. In a rotary abrasive surface finishing drum, in combination: a hub structure embodying a plurality of circumferentially spaced peripheral anchor sockets extending parallel to the axis of rotation of the drum, each of said sockets including a radially extending restricted mouth and an inner socket chamber having a circumferentially extending retainer shoulder; and a plurality of abrasive segments each including a pack of abrasive leaves and an anchor strip having a web to which inward end portions of said leaves are secured to provide respective solid butt sections from which the leaves project in outwardly fanned array, with the tip portions thereof relatively loose and flexible, each of said anchor strips further including, in the inward portion thereof, an anchor head providing a circumferentially extending anchor part engaged against said retainer shoulder to lock the anchor strip in the respective socket, with the respective web extending through and embraced between the walls of the respective socket mouth, whereby the respective abrasive segments are supported on said hub with their tips collectively defining a cylindrical abrading periphery on said drum; said hub comprising a shaft and a plurality of headers of circular disc form mounted concentrically on said shaft in axially spaced relation and having axially opposed retained recesses; and said anchor sockets comprising pairs of channel bars having substantially radial lateral legs in adjacent, circumferentially spaced relation, defining the mouths of the respective anchor sockets, said inner socket chambers thereof being merged in a common open interior of the hub, said legs having inward margins defining said retainer shoulders, and said channel bars having respective circumferentially extending webs collectively defining the periphery of the hub.

References Cited in the file of this patent

UNITED STATES PATENTS

| | | |
|---|---|---|
| 1,475,074 | McLaughlin | Nov. 20, 1923 |
| 2,871,632 | Cosmos | Feb. 3, 1959 |